(12) United States Patent
Morhenn et al.

(10) Patent No.: US 6,710,159 B2
(45) Date of Patent: Mar. 23, 2004

(54) POLYAMIDE COMPOSITION AND METHOD FOR PRODUCING THE SAME

(75) Inventors: Heinrich Morhenn, Köln (DE); Dieter Göbbels, Kempen (DE); Cliff Scherer, Schwalmtal (DE); Frank Weyrich, Haan (DE); Konrad Triebeneck, Bergisch Gladbach (DE); Klemens Kohlgrüber, Kürten (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 10/239,982

(22) PCT Filed: Mar. 19, 2001

(86) PCT No.: PCT/EP01/03116

§ 371 (c)(1),
(2), (4) Date: Sep. 26, 2002

(87) PCT Pub. No.: WO01/74925

PCT Pub. Date: Oct. 11, 2001

(65) Prior Publication Data

US 2003/0176625 A1 Sep. 18, 2003

(30) Foreign Application Priority Data

Mar. 30, 2000 (DE) .......................... 100 15 862

(51) Int. Cl.[7] .............................. C08G 69/08
(52) U.S. Cl. ................. 528/310; 422/131; 422/135; 524/451; 264/176.1; 264/219
(58) Field of Search .................. 528/310; 422/131, 422/135; 524/451

(56) References Cited

U.S. PATENT DOCUMENTS

| | | | |
|---|---|---|---|
| 3,630,689 A | 12/1971 | Wheeler et al. | 23/285 |
| 4,537,954 A | 8/1985 | Ando et al. | 528/481 |
| 4,578,455 A | 3/1986 | Pipper et al. | 528/501 |
| 4,699,976 A | 10/1987 | Matsubara et al. | 528/501 |
| 5,459,168 A | 10/1995 | Nasr et al. | 521/498 |
| 5,962,769 A | 10/1999 | Albertsen et al. | 800/303 |
| 6,124,426 A * | 9/2000 | Sugimoto et al. | 528/480 |
| 6,476,181 B1 * | 11/2002 | Alsop et al. | 528/323 |
| 6,485,607 B1 * | 11/2002 | Elsner et al. | 159/2.1 |

FOREIGN PATENT DOCUMENTS

| | | |
|---|---|---|
| DE | 43 24 616 | 1/1995 |
| DE | 19 505 150 | 8/1996 |

* cited by examiner

*Primary Examiner*—Terressa Boykin
(74) *Attorney, Agent, or Firm*—Joseph C. Gil; John E. Mrozinski, Jr.

(57) ABSTRACT

A process for producing a polyamide or copolyamide freed from volatile constituents by removing the volatile constituents, in particular the monomers and dimers, in at least two stages from the polymer melt by using an, in particular, gaseous entrainer is described. The invention also relates to polyamide compositions made of polyamide 6 or a copolyamide with a reduced volatile constituent content, as well as moulding compositions made of the above-mentioned polyamides, and moulded articles and fibers which are produced from these moulding compositions.

23 Claims, 3 Drawing Sheets

POLYAMIDE COMPOSITION AND METHOD FOR PRODUCING THE SAME

FIELD OF THE INVENTION

The invention relates to a process for producing a polyamide or copolyamide freed from volatile constituents by removing the volatile constituents, in particular the monomers and dimers, in at least two stages from the polymer melt using an, in particular, gaseous entrainer. The invention also relates to polyamide compositions made of polyamide 6 or a copolyamide with a reduced content of volatile constituents, as well as moulding compositions made of the above-mentioned polyamides, and moulded articles and fibres which are produced from these moulding compositions.

BACKGROUND OF THE INVENTION

When producing polyamide 6 (PA 6) and using copolyamides with PA 6 as the main constituent, the conversion in the reaction is limited by a chemical equilibrium. As a result, the mixture leaving the reaction at 270° C. still contains residual monomers ($\epsilon$-caprolactam) and oligomers (cyclic dimers, cyclic trimers, cyclic tetramers etc., which are called dimers, trimers or tetramers hereinafter) in a total quantity of approximately 10%.

Polyamide is distinguished from other polymers, such as polycarbonate, SAN resin or polystyrene, in that the volatile components (in particular the oligomers) have an extremely low vapour pressure in the reaction mixture during production (for example the vapour pressure of the dimer of $\epsilon$-caprolactam at 300° C. is only 100 mbar). To process the product (for example by the injection moulding process) it is necessary to reduce the dimers as well as the monomers to a very low residual content as undesirable effects, such as depositions in the injection moulding tool or other parts of the machinery, otherwise occur during processing and a thick covering forms in the case of dark coloured conditioned polyamide moulded articles.

Owing to the low vapour pressure of the dimer, the reduction of monomers and dimers by an evaporation process requires a high processing temperature (typically 250 to 320° C.) and evaporation at very low pressure. The high temperature is also required to keep the product flowable and pumpable. The high temperature in an evaporation process is generally detrimental to the quality of the product (the product tends to yellow and chain breakages occur in the polymer). Therefore, short residence times are required when carrying out the reaction.

Initially, effective heat transfer from the heating medium to the product is required in an evaporation process in order to obtain the evaporation enthalpy necessary for evaporating the volatile constituents at the lowest possible heating temperature. At the end of an evaporation process when only small monomer or oligomer contents are still present, mass transfer by diffusion is crucial to the outcome of degassing. This necessitates a high driving force for the diffusion process and a low partial pressure of the components in the gaseous phase, large material exchange surfaces and the longest possible residence times under vacuum.

Two fundamentally different procedures are known for reducing the volatile components in polyamide 6 and copolyamides with PA 6 as the main constituent.

In the extraction processes described in Offenlegungsschriften DE 43 24 616 A1 and DE 19 505 150 A1, the highly viscous reaction mixture is cooled and granulated after the reaction. The monomers and oligomers contained in the granules are then extracted with water or a caprolactam/water mixture formed or pure caprolactam by counter-current extraction lasting approximately 24 hours. The extracted granules are dried in a drying stage which also lasts 24 hours. The aqueous solution from extraction, which now contains the monomers and oligomers, is concentrated in an evaporation stage. The so-called concentrated liquor produced in the process is supplied to the reaction, the evaporated water to the extraction. The granules obtained by this process can have very small volatile constituent contents (content of $\epsilon$-caprolactam $\leq 0.35\%$, dimer $\leq 0.15\%$, trimer $\leq 0.25\%$ and tetramer $\leq 0.3\%$). Furthermore, the exposure to heat is comparatively low.

The major disadvantage of this process is the very long residence time in the extraction and drying phases and the associated very bulky apparatus for large throughputs of product. This means that a high level of expenditure is required to carry out such a process. A further disadvantage is the large amount of energy required for drying and evaporating the extracted water.

Evaporation processes, in particular mechanical processes, are also known. Machines such as extruders (single- or multi-screw extruders) or thin film evaporators are often used for evaporating polymers (cf. DE 3 310 676.A1, DE 4 328 013.A1 or U.S. Pat. No. 3,630,689). The disadvantages of mechanical processes are the expensive evaporation extruders or thin film extruders, the wear of rotating parts and the difficulties in handling the very heavy machine parts required. In particular with a high throughput of product, there is also a high mechanical load on the product which leads to a very high product temperature and subsequent damage to the product. In addition, these processes do not generally satisfy the high demands placed on industrial polyamide raw materials with the low oligomer content, in particular the dimer content, required for processing and the properties of the end product.

Evaporation processes using devices without moving mechanical parts are also known. The Offenlegungsschriften DE 3 409 066 and EP 200 368 A1 describe a two- and three-stage process using two and three shell-and-tube heat exchangers with separators immediately following the bank of tubes which are operated at various pressures below atmospheric pressure (during the second and third stage in the three-stage process or both stages in the two-stage process). The processes are used for removing volatile constituents from styrene polymers and styrene copolymers or rubber-modified styrene polymers. In this process liquid entrainers, such as water or alcohols, are used prior to the last stage of evaporation. Liquid entrainers are undesirable because sudden evaporation, which is associated with boiling of the film, occurs when the entrainer contacts the hot polymer melt, owing to the high temperature differences between melt and entrainer. This causes pulsation in the reaction chamber and adversely affects dispersion of the entrainer. When using organic entrainers with polyamide 6 and copolyamides, additional safety precautions are required as the danger of explosion has to be taken into account, and this entails high expenditure on safety.

A further method of isolating polymer solutions with simple apparatus is a process using a combination of a coiled tube evaporator and extrusion evaporator as described in the publication WO 99/04023. This process is not suitable for polyamides because the residence time in the extrusion evaporator is not sufficient for the residual contents required in this case, in particular as it is not possible to use an entrainer with the extrusion evaporator without the strands breaking.

DETAILED DESCRIPTION OF THE INVENTION

The object of the invention is to reduce the monomer (ε-caprolactam) and cyclic dimer contents in the polyamide 6 by an evaporation process to a monomer content of at most 0.7%, in particular at most 0.35% and preferably at most 0.2% and to a dimer content of at most 0.3%, in particular at most 0.2% and preferably 0.15% (measured by HPLC analysis as described below). A simple method which can be carried out using inexpensive devices is to be employed. The distinction from known evaporation processes is that, on the one hand, the monomers and dimers have a very low vapour pressure and, on the other hand, the very low diffusion coefficient of the dimers (of about $10^{-11}$ m$^2$/s) makes exchange of material very difficult.

The object is achieved according to the invention by two-stage evaporation of the polymer melt using a shell-and-tube heat exchanger and a loop-type evaporator or two shell-and-tube heat exchangers connected in series. A special feature of the process according to the invention is the use of a highly volatile, gaseous entrainer (preferably water vapour or nitrogen) which is dispersed in the polymer between the two devices by a static mixer under elevated pressure.

The invention relates to a process for producing polyamide or copolyamide freed from volatile constituents by removing the volatile constituents, in particular the monomers and dimers, in at least two stages from a polyamide 6 or a copolyamide of polyamide 6, characterised in that in the first stage the polymer melt is introduced into a shell-and-tube heat exchanger, in particular at a temperature of 200 to 300° C., the monomers and dimers are evaporated at a shell-and-tube heat exchanger temperature of 250 to 300° C. and the volatile constituents are removed in a first separator connected downstream at a pressure of at most 300 mbar (at most 30,000 Pa), preferably from 10 to 300 mbar (10 to 300 hPa), particularly preferably from 10 to 30 mbar (10 to 30 hPa) at a temperature in the separator of 250 to 300° C., in that a preferably gaseous entrainer, in particular nitrogen, an inert gas, carbon dioxide or water vapour, is introduced into the degassed polymer obtained in a molar ratio of entrainer to polymer of at least 1:1, in particular of 1:1 to 10:1, particularly preferably of 1:1 to 4:1, in that the entrainer is subsequently dispersed in the polymer melt using a static mixing element, in particular an at least two-stage mixer, in that in a second stage the mixture obtained is introduced into a shell-and-tube heat exchanger or a loop-type evaporator or a combination of shell-and-tube heat exchanger and loop-type evaporator, in each case with separator connected downstream, and further volatile constituents, in particular dimers and residual monomers, are evaporated at a temperature of 250 to 350° C., in that the volatile constituents are removed in the second separator at a pressure of at most 10 mbar (10 hPa), preferably of at most 8 mbar (8 hPa), particularly preferably at most 2 mbar (2 hPa) and a temperature in the second separator of 250 to 300° C., and the degassed polymer melt is removed from the separator.

The static mixer is advantageously designed with at least two stages in such a way that a mixer with a larger diameter is used for pre-dispersion as first stage. In this first stage the initially large gas bubbles of the entrainer are dispersed before being finely dispersed in a second mixing stage, which is smaller in diameter, with high shear and tensile stress. Large gas bubbles cannot be dispersed satisfactorily in a smaller diameter mixer as large bubbles re-agglomerate after dispersion in small diameter mixers. Therefore, high pressure is also required at the entry into the mixing section in order to produce small volumes of gas, i.e. small bubbles. The polyamide 6-monomer-oligomer mixture leaving the reaction with a monomer content of approximately 10 wt. % and a dimer content of 0.4 to 1 wt. % is fed, preferably from above, to a shell-and-tube heat exchanger as described which is heated to a heating temperature above the glass transition temperature of the polymer. The shell-and-tube heat exchanger is preferably constructed vertically and is then placed directly on a vapour separator. The pressure in the separator is below atmospheric pressure, and preferably at 10 to 300 mbar.

All percentages relating to compositions are to be understood hereinafter as percent by weight unless stated otherwise.

The process is advantageously carried out in such a way that evaporation in the first stage commences in the tubes. This increases the heat transfer in comparison with the one-phase state and reduces the residence time owing to foaming. In the first stage separator, the polymer and the gaseous components are separated from one another. The polymer is preferably discharged from the separator by a gear pump or a discharge screw.

In particular, the demand for a reduction in the dimer content to a value of <0.2%, which forms the object of the invention, requires large material exchange surfaces, a very low partial pressure of the components to be removed and a long residence time under vacuum in order to overcome the diffused mass transfer. This is advantageously achieved by applying a high vacuum in a second degassing stage (at most 2 mbar) and by mixing small quantities of entrainer in a static mixer. Owing to the entrainer, the partial pressure of the dimers and monomers is reduced in the gaseous phase. The polymer is foamed, as a result of which a large material exchange surface and large diffusion paths are produced. In the second degassing stage, the resulting polymer foam is distributed over loops located in the second separator which is subjected to reduced pressure. The polymer runs down the loops due to gravity. As a result, the product has a long residence time under vacuum and makes limited contact with metal faces. By varying the length and number of loops, the residence time of the polymer can be varied widely. A further shell-and-tube heat exchanger can be used in the second stage instead of the loop-type evaporator. The geometry of the tubes of the shell-and-tube heat exchanger is advantageously selected in such a way that the pressure loss is as low as possible for good accessibility to vacuum. The advantages of the shell-and-tube heat exchanger compared with the loop-type evaporator are primarily its greater availability and the possibility of an additional energy supply. A combination of the two devices is also possible. With this combined device, the loops are secured to the lower end of each tube of the shell-and-tube heat exchanger.

Dispersion of the entrainer to a very fine foam is advantageously achieved with an at least two-stage mixer in which strong shear and expansion flows are produced. This simultaneously results in an increased drop in pressure and therefore increased pressure (typically >20 bar) at the feed point of the entrainer which is advantageous for dispersion.

A gear pump or a discharge screw can be used for discharging the degassed polyamide from the second degassing stage. The polyamides can be processed directly into specific compounds (for example fibre-reinforced polyamide) or the polyamide can be coloured using a static or dynamic mixer or a screw connected downstream of the second stage.

In a preferred variation of the process, the melt issuing from the second separator is therefore immediately compounded or provided with additives.

In a preferred variation of the process it is advantageous to design the discharge screw of the second degassing stage as a compounder. As a result, the degassed polymer obtained from the second stage can be processed to granules immediately after removal and optionally compounding.

A particularly preferred variation of the process is one in which a combination arranged in loop form of a liquid ring pump, an injection condenser, a dip tank and a circulating pump, is used as a vacuum generator for removing the volatile components, liquid caprolactam being preferably used as the condensing agent.

Particularly preferably the injection condenser is preceded by a steam jet operated with caprolactam as the propellant.

In another particularly preferred variation of the process the injection condenser is preceded by a series-connected combination of a first steam jet, an additional injection condenser and a second steam jet, the condensate at the bottom of the additional injection condenser being delivered to the dip tank and caprolactam preferably being used as the propellant for the steam jet.

Using the special types of vacuum generation the water-free removal of volatile components is made possible which renders the entire process even more economical than known separation processes.

In addition, the systematic condensation and removal of high-boiling components (dimers etc.) is made possible.

Any basically known types of polyamide 6 and copolyamides of polyamide 6 with a relative solution viscosity of $\eta rel=2.4$ to 4.5, preferably $\eta rel=2.5$ to 3.5, particularly preferably $\eta rel=2.6$ to 3.2 can be used for the process.

Polyamides from the monomer categories: lactams or aminocarboxylic acids or diamines and dicarboxylic acids or mixtures thereof can also be used for the process.

Polyamides based on:
ε-caprolactam and mixtures of ε-caprolactam and aminoundecanoic acid and the diamines 1,6-hexamethylenediamine, isophoronediamine and the dicarboxylic acids adipic acid, isophthalic acid and mixtures thereof with a ε-caprolactam content of >75 wt. % in the final polymer are preferred.

Particularly preferred polyamides are based on:
ε-caprolactam and 1,6-aminocaproic acid.

Copolyamides which can optionally be used are those based on:
mixtures of ε-caprolactam and other lactams with 7 to 15 carbon atoms and $\alpha,\omega$-diamines with 4 to 20 carbon atoms which are derived from alkylene or arylene and the $\alpha,\omega$-dicarboxylic acids with 4 to 20 carbon atoms which are derived from alkylene or arylene and mixtures thereof with a ε-caprolactam content of >50 wt. % in the final polymer.

The relative solution viscosity in the context of the invention is measured as relative viscosity (ratio of flow times in an Ubbelohde viscometer) of a cresol solution of 1 g PA sample made up to 100 ml of solution.

The viscosity number in sulphuric acid (1% PA in 96% $H_2SO_4$) to ISO 307 is also normal.

Owing to the inline compounding which can be achieved with the process according to the invention, the melting of the polymers necessary with spatially and temporally separated delactamisation and compounding stages is omitted. This reduces the size of the compounding machines and the thermal stress on the product.

The invention also relates to a polyamide composition made of polyamide 6 or a copolyamide with polyamide 6 with a reduced content of volatile constituents, in particular monomers or dimers, which is obtained by degassing the polymer melt and is characterised in that the polymer compound has a monomer (ε-caprolactam) content of at most 0.7 wt. %, in particular at most 0.3 wt. %, particularly preferably at most 0.2 wt. % and a dimer content of at most 0.3 wt. %, in particular at most 0.2 wt. %, particularly preferably at most 0.15 wt. %.

Preferred areas of application for the polyamides obtained from the process are
1. Direct use as moulding compositions for producing moulded articles.
2. Moulding compositions for producing compounds in a separate process step by adding additives during melt compounding using twin-screw extruders which only then is used as a moulding composition for producing moulded articles.

The invention also relates to moulding compositions for producing moulded articles, hollow articles, (un)reinforced semi-finished products, films or fibres and mono-filaments containing a polyamide composition according to the invention. The invention also relates to moulded articles, fibres or monofilaments produced from the moulding compositions according to the invention.

The process according to the invention is, as described, particularly suitable for polyamide 6 and copolymers with polyamide 6 as main constituent. The process can, however, also be used in principle for other thermoplastic materials, in particular when extremely low monomer and solvent contents are required in polymers.

The process will be described in more detail below with the aid of examples and drawings, in which:

EXAMPLES

Example 1

Figure 1:
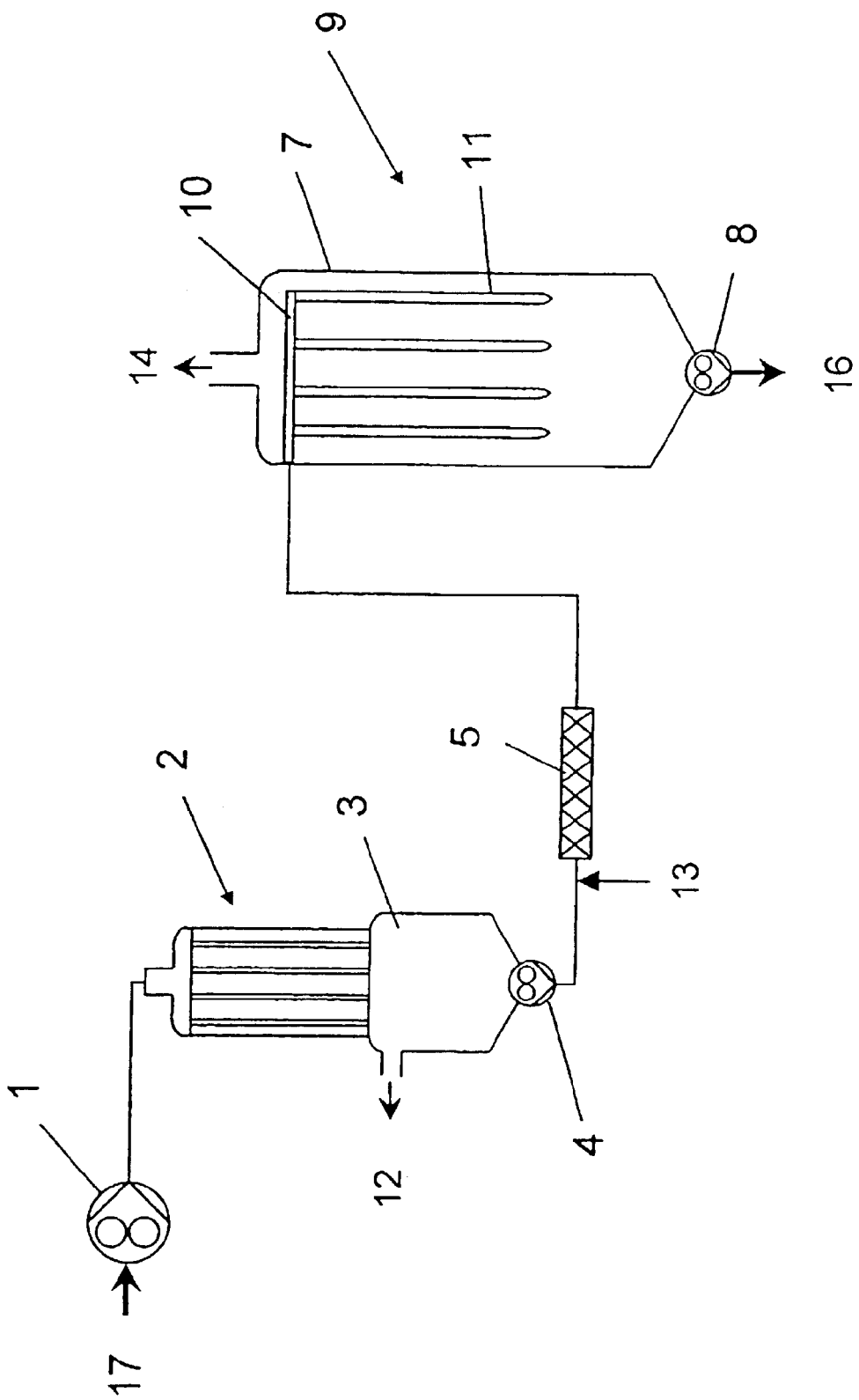
FIG. 1 is a flow diagram of a two-stage machine consisting of a shell-and-tube heat exchanger with separator including discharge means connected downstream and a loop-type evaporator with discharge means. A static mixer for entrainer dispersion is located between the two stages.
Figure 2:
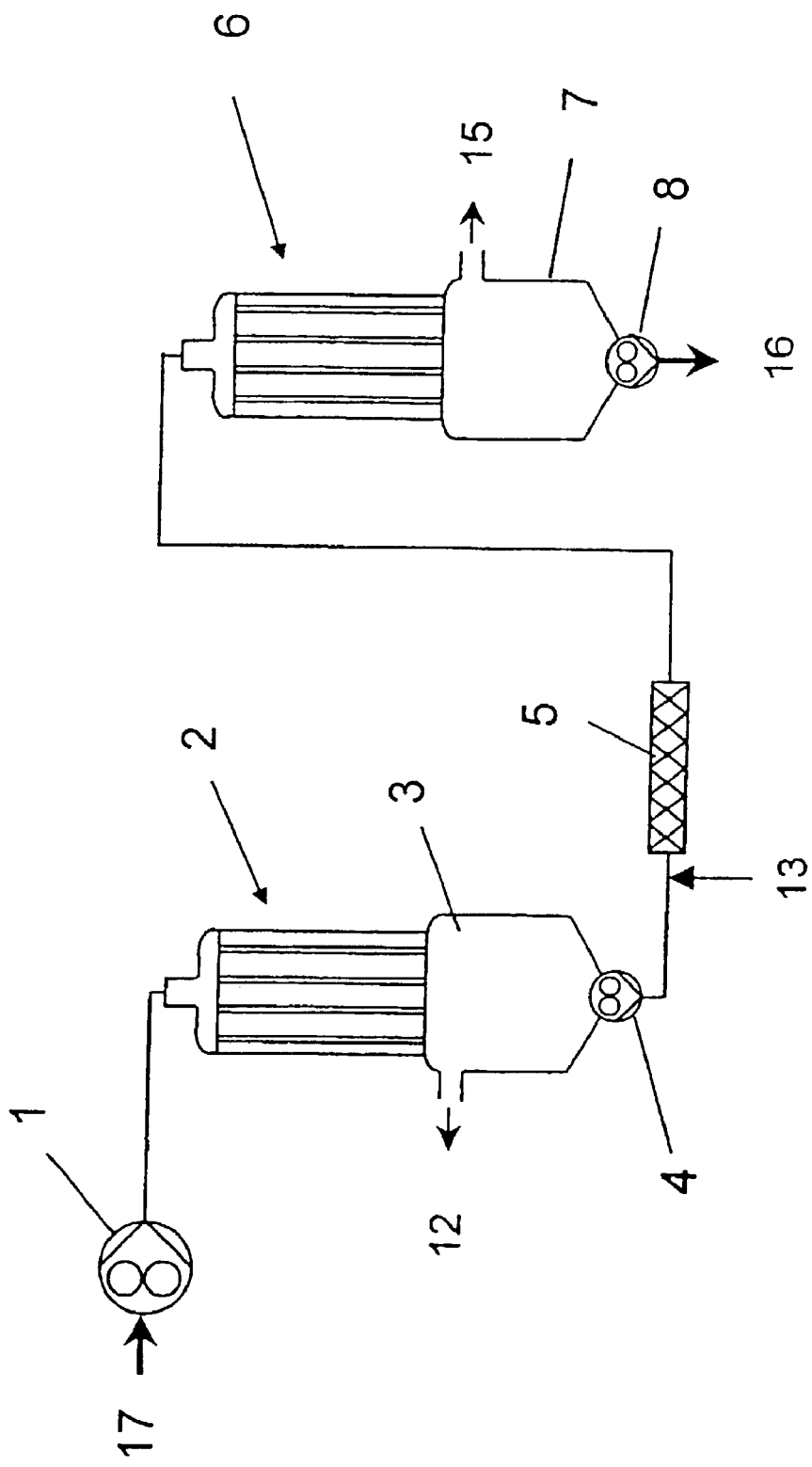
FIG. 2 is a flow diagram of a two-stage machine consisting of two shell-and-tube heat exchangers with separators including discharge means connected downstream and a static mixer between the two stages for entrainer dispersion.

The process was tested in accordance with the processing diagram in FIG. 1 with polyamide 6 (Durethan B26 type, produced by Bayer AG with a rel. viscosity $\eta rel=$ approximately 2.6), which still contains approximately 8 wt. % of lactam and approximately 0.5 wt. % of cyclic dimer after production. The reaction mixture was conveyed into the first stage of the machine at a temperature of 270° C. The first stage of the machine consists of a shell-and-tube heat exchanger 2 with four tubes having an internal diameter of 10 mm and a length of 1 m. The bank of tubes 2 was heated to a temperature of 270° C. Evaporation of the volatile components commenced inside the tubes, producing a polymer foam. Some of the gaseous components were separated from the highly viscous liquid phase in the tubes. The bank of tubes 2 is located above a commercially available first separator 3 in which the final separation of gas and polymer phase takes place. The gaseous phase is drawn off at the top through outlet 12, the polymer phase is discharged via a large-mouthed gear pump 4. The pressure in the separator 3 was varied from 20 to 50 mbar (see Table 1 and 2).

The entrainer was added to the polymer melt just upstream of the static mixer 5. The mixing elements of the mixer 5 are of the SMX type made by Sulzer (Switzerland). A mixer 16 mm in diameter and 300 mm in length was used as first mixing stage and a mixer 10 mm in diameter and 120 mm in length was used as second stage.

The polymer was foamed in the static mixer 5 by means of the entrainer 13. Nitrogen and water vapour were used as entrainer. The pressure at the entrainer feed point was approximately 40 bar. The throughput of entrainer was varied between 0 and 240 g/h (nitrogen) or 0 and 120 g/h (water vapour) in the various experiments. The throughput of reaction mixture was 5 and 8 kg/h.

The foam leaving the static mixer 5 was distributed over four loops 11 in a loop-type evaporator 9 via a distributor tube 10. The loops 11 were 1.5 m long and were produced from 1 mm thick wire. The loops 11 were suspended in the degassing chamber 7 which was evacuated by a vacuum pump via line 14 to a pressure of approximately 0.7 to 2.5 mbar (see Table 1 and 2). Owing to gravity, the polymer foam runs down the loops 11. In the process, the gas bubbles dispersed in the polymer burst, and the volatile components and entrainer are separated. The loop-type evaporator 9 and the static mixer 5 are heated with oil to a temperature of 300° C. The degassed polymer 16 was discharged by a further gear pump 8 and cooled in a water bath and granulated for analysis.

Tables 1 and 2 show the results of the measurements. The residual lactam and cyclic dimer content was determined by the HPLC method. As a result of the process, a lactam content between 0.13 and 0.5 wt. % was achieved. The dimer contents were between 0.1 and 0.25 wt. %.

The influence of the entrainer content on the residual volatile constituent content is clear from the measured values in Tables 1 and 2. The outcome of degassing (compared to procedure without entrainer) is significantly improved even with small entrainer contents of 0.5 wt. % (for example, the lactam content decreases from 0.5 to 0.2 wt. %). In the range examined, the residual contents become slightly poorer with increasing entrainer content. The results when using nitrogen as entrainer are somewhat better than those obtained when using water vapour. Further tests with polyamide 6 with a higher starting viscosity (Durethan B29 type, produced by Bayer AG with a rel. viscosity $\eta$rel approximately 2.94) and copolyamides (CPA) produced similar results with the same procedure. A lactam content of up to 0.1 wt. % and dimer contents up to 0.11 wt. % were achieved.

Example 2

As an alternative, a shell-and-tube heat exchanger 6 with four tubes was tested as second degassing stage. The tubes had an internal diameter of 23 mm and were 1 m in length. These tests were carried out under operating conditions regarding throughput, temperature, pressure in the separators, which were otherwise identical to the tests with the loop-type evaporator described above (see Table 1). Using nitrogen as entrainer, a lactam content of up to 0.17 wt. % and a dimer content of up to 0.25 wt. % were achieved for polyamide (Durethan B29 type, viscosity, $\eta$rel=2.94).

The results regarding coating formation and residual oligomer values (HPLC method) are summarised in Table 3. The coating formation appearing in the form of whitish surface patterns was examined optically on multifunctional ISO 1110-conditioned black-coloured rectangular plates produced from 30% glass fibre-filled mixtures on the basis of the polyamide resin to be tested. Polyamide produced according to the invention (example 1 and 2 in Table 3) had a tendency to much slighter coating formation than materials produced by one-stage vacuum delactamisation (see example 5 in Table 3) or multi-screw extrusion (example 6 in Table 3). In comparison with conventional material extracted with water (see examples 3 and 4 in Table 3) coating formation which is practically equivalent and acceptable can be achieved by the technique according to the invention.

Description of HPLC Analysis 1 g of polymer sample is weighed-in exactly and dissolved in 20 ml formic acid. The solution is then precipitated with 250 ml methanol. After several hours the solution is filtered off via a pleated filter into a weighed 250 ml round-bottomed flask. The sample is then evaporated, cooled and concentrated to approximately 20 ml. The sample is then made up to exactly 20 g of solution. If necessary, the solution is filtered by means of a blue band filter (1 g of sample dissolved in 20 g of methanol). A 25 $\mu$l syringe is drawn up with approximately 20 $\mu$l of solution which is gradually injected into an HPLC unit with acetonitrile/water as eluant mixture. The oligomers were detected by UV spectroscopy at 210 nm.

TABLE 1

| Through-put | Product temperatures | | Vacuum | | Through-put | | Oligomer contents | | Relative viscosity |
| --- | --- | --- | --- | --- | --- | --- | --- | --- | --- |
| | | | | | | | Lactam wt. % | Dimers wt. % | $\eta$rel |
| | Entry stage 1 | Entry stage 2 | Stage 1 | Stage 2 | $N_2$ | | Starting product (B26) | | |
| kg/h | (° C.) | (° C.) | mbar | mbar | g/h | Sampling | 8.40 | 0.38 | 2.27 |
| 7.5 | 265 | 298 | 36 | 0.70 | 0 | outlet 2 | 0.47 | 0.16 | — |
| 7.5 | 265 | 298 | 36 | 0.35 | 0 | outlet 2 | 0.48 | 0.13 | — |
| 7.5 | 265 | 298 | 36 | 0.35 | 0 | outlet 2 | 0.48 | 0.14 | — |
| 7.5 | 265 | 298 | 36 | 0.35 | 0 | outlet 2 | 0.45 | 0.14 | — |

TABLE 1-continued

| Through-put | Product temperatures | | Vacuum | | Through-put | | Oligomer contents | | Relative viscosity |
|---|---|---|---|---|---|---|---|---|---|
| | Entry stage 1 | Entry stage 2 | Stage 1 | Stage 2 | N₂ | | Lactam wt. % | Dimers wt. % | ηrel |
| | | | | | | | Starting product (B26) | | |
| kg/h | (° C.) | (° C.) | mbar | mbar | g/h | Sampling | 8.40 | 0.38 | 2.27 |
| 7.5 | 265 | 298 | 36 | 0.60 | 0 | outlet 2 | 0.47 | 0.16 | — |
| 7.5 | 265 | 298 | 36 | — | 0 | outlet 1 | 3.1 | 0.28 | — |
| 7.5 | — | — | — | — | — | after extrusion | — | — | — |
| 8 | 265 | 298 | 24 | 0.45 | 80 | outlet 2 | 0.42 | 0.186 | 2.79 |
| 8 | 265 | 298 | 24 | 0.45 | 160 | outlet 2 | 0.4 | 0.258 | 2.79 |
| 8 | 264 | 299 | 48 | 0.7 | 40 | outlet 2 | 0.18 | 0.087 | 2.8 |
| 8 | 263 | 299 | 48 | 0.7 | 120 | outlet 2 | 0.19 | 0.091 | 2.81 |
| 8 | 264 | 299 | 48 | 0.6 | 160 | outlet 2 | 0.2 | 0.101 | 2.79 |
| 8 | 265 | 299 | 46 | 0.6 | 200 | outlet 2 | 0.22 | 0.124 | 2.83 |
| 8 | 266 | 299 | 46 | 0.6 | 240 | outlet 2 | 0.19 | 0.142 | 2.81 |
| 8 | 266 | 299 | 46 | — | — | outlet 1 | 2.3 | 0.48 | 2.52 |
| 8 | — | — | — | — | — | after extrusion | 7.6 | 0.49 | 2.35 |
| 5 | 268 | 300 | 34 | 0.6 | 40 | outlet 2 | 0.17 | 0.128 | 0.91 |
| 5 | 268 | 300 | 34 | 1.0 | 80 | outlet 2 | 0.14 | 0.13 | 2.91 |
| 5 | 269 | 300 | 34 | 2.5 | 120 | outlet 2 | 0.14 | 0.131 | 2.83 |
| 5 | 270 | 301 | 34 | 0.5 | 0 | outlet 2 | 0.18 | 0.133 | 2.93 |
| 5 | 270 | 301 | 34 | — | — | outlet 1 | 2.2 | 0.5 | 2.56 |
| 5 | — | — | — | — | — | after extrusion | 8.1 | 0.48 | 2.36 |

TABLE 2

| Through-put | Product temperatures | | Vacuum | | Through-put | | Oligomer contents | | Relative viscosity |
|---|---|---|---|---|---|---|---|---|---|
| | Entry stage 1 | Entry stage 2 | Stage 1 | Stage 2 | H₂O | | Lactam wt. % | Dimers wt. % | ηrel |
| | | | | | | | Starting product (B26) | | |
| kg/h | (° C.) | (° C.) | mbar | mbar | g/h | Sampling | 8.40 | 0.39 | 2.27 |
| 8 | 268 | 300 | 40 | 1.0 | 40 | outlet 2 | 0.17 | 0.109 | 2.79 |
| 8 | 268 | 300 | 40 | 1.2 | 20 | outlet 2 | 0.20 | 0.178 | 2.76 |
| 8 | 268 | 295 | 40 | 1.6 | 80 | outlet 2 | 0.15 | 0.184 | 2.71 |
| 8 | 268 | 293 | 40 | 7.5 | 120 | outlet 2 | 0.14 | 0.256 | 2.65 |
| 8 | 268 | 293 | 40 | — | — | outlet 1 | 25 | 0.51 | 2.49 |
| 8 | — | — | — | — | — | after extrusion | 8.30 | 0.51 | 2.33 |
| 8 | 268 | 282 | 32 | 0.9 | 0 | outlet 2 | 0.23 | 0.26 | 2.65 |
| 8 | 267 | 282 | 32 | 0.7 | 20 | outlet 2 | 0.2 | 0.25 | 2.68 |
| 8 | 267 | 281 | 32 | 1.0 | 40 | outlet 2 | 0.13 | 0.19 | 2.67 |
| 8 | 268 | 278 | 32 | 1.5 | 80 | outlet 2 | — | — | — |
| 8 | 268 | 278 | 32 | — | — | outlet 1 | 2.5 | 0.52 | 2.5 |
| 8 | — | — | — | — | — | after extrusion | 8.2 | 0.51 | 2.33 |

TABLE 3

Evaluation of coating formation on GF-reinforced, black-coloured PA rectangular plates after storage
(ISO 1110; 70° C., 62% relative humidity)

| Days | SQC 505 ZT-TE test 18.2.18.4. Example 1 | SQC 506 ZT-TE test 19.4.–19.9. Example 2 | Comparison 1: PA-6 water extracted conventionally Example 3 | Comparison 2: PA-6 water extracted conventionally Example 4 | Comparison 3: PA-6 one-stage loop-type evaporator delactamised Example 5 | Comparison 4: PA-6 multiple screw extruder delactamised Example 6 |
|---|---|---|---|---|---|---|
| 0 | 1 | 1 | 1 | 1 | 1 | 1 |
| 10 | 1 | 1 | 1 | 1 | not measured | not measured |
| 20 | 3 | 2 | 1 | 2 | not measured | not measured |
| 50 | 2 | 2 | 1 | 1 | 6 | 6 |
| 100 | 2 | 3 | 1 | 2 | 6 | 6 |
| Rapid extraction (%) | | | | | | |
| Caprolactam | 0.630 | 0.200 | 0.067 | 0.330 | 0.94 | 0.4 |
| Dimer | 0.190 | 0.260 | 0.160 | 0.130 | 0.48 | 0.33 |

TABLE 3-continued

Evaluation of coating formation on GF-reinforced, black-coloured PA rectangular plates after storage
(ISO 1110; 70° C., 62% relative humidity)

| Days | SQC 505 ZT-TE test 18.2.18.4. Example 1 | SQC 506 ZT-TE test 19.4.–19.9. Example 2 | Comparison 1: PA-6 water extracted conventionally Example 3 | Comparison 2: PA-6 water extracted conventionally Example 4 | Comparison 3: PA-6 one-stage loop-type evaporator delactamised Example 5 | Comparison 4: PA-6 multiple screw extruder delactamised Example 6 |
|---|---|---|---|---|---|---|
| Trimer | 0.570 | 0.600 | 0.150 | 0.240 | 0.7 | 0.61 |
| Tetramer | 0.520 | 0.520 | 0.210 | 0.280 | 0.57 | 0.51 |

Evaluation of the Coating Formation:

| Evaluation | Description |
|---|---|
| 1 | No coating formation |
| 2 | Slight coating formation |
| 3 | Medium coating formation |
| 4 | Thick coating formation |
| 5 | Very thick coating formation |
| 6 | Extreme coating formation |

Example 3

Figure 3:
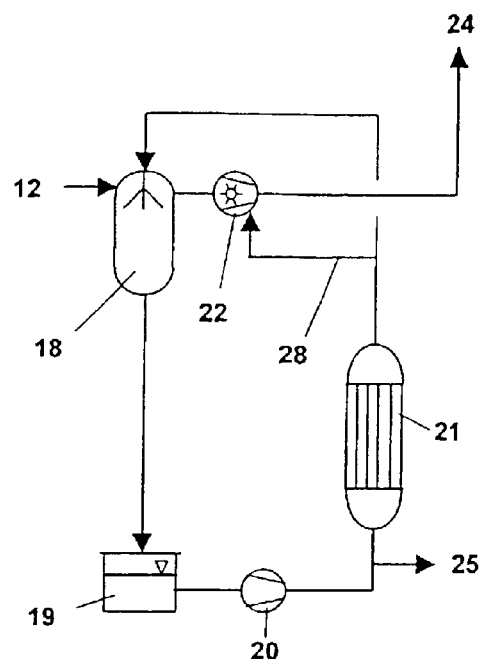
FIG. 3 is a schematic illustration of a vacuum generator to be connected to the outlet 12 of the unit according to FIG. 1.

In the variation of the process described in the following the vacuum generation and the condensation of the evaporated monomers and oligomers is effected by operating the vacuum units and condensers exclusively with caprolactam (without any other auxiliaries such as for example water). In the first stage (FIG. 3) the vapours from the outlet 12 of the shell-and-tube evaporator 2 (see FIG. 1) are condensed in the injection condenser 18 on caprolactam of a temperature of about 90° C. The caprolactam issuing from the injection condenser 18 is recycled via a loop to the injection condenser 18. The loop consists of an injection condenser 18; a dip tank 19 with a barometric seal, a circulating pump 20, and a heat exchanger 21 for adjusting the loop temperature. A partial stream 25 with the evaporated and condensed monomer is continuously discharged from the loop. The monomer discharged is reused as a raw material in the polycondensation reaction. In order to create the vacuum and draw off the inert constituents by suction a liquid ring vacuum pump 22 is arranged downstream of injection condenser 18. Liquid caprolactam is used as the liquid required for the functioning of the vacuum pump 22. For this purpose a small branch stream 28 is taken from the above-mentioned caprolactam loop and delivered to the vacuum pump 22. Then the excess caprolactam is recycled into the loop. The non-condensed, inert components are drawn off by suction by the vacuum pump 22 and delivered to an exhaust gas cleaning unit 24. This form of vacuum generation allows the contamination-free recycling of the monomer.

Example 4

Figure 4:
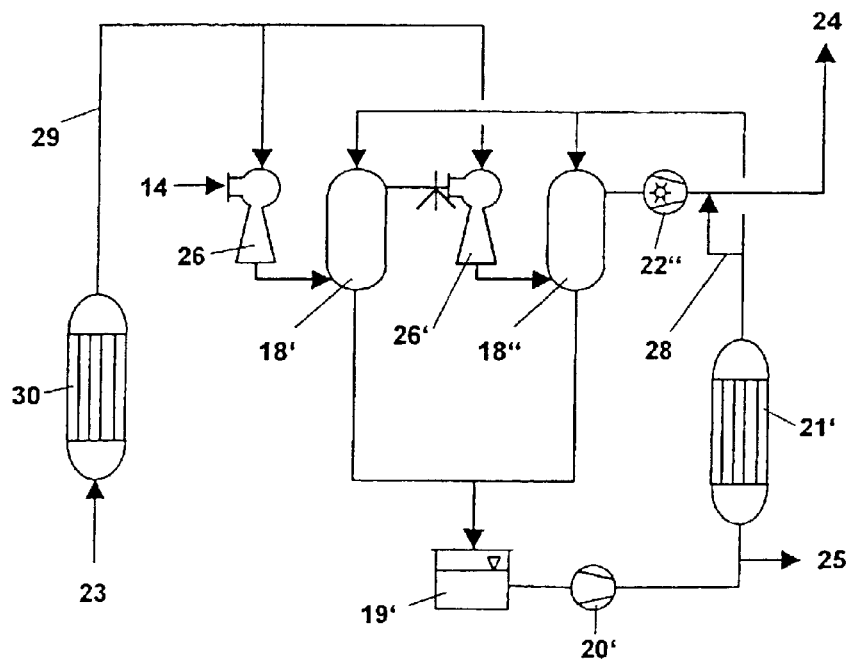
FIG. 4 is a schematic illustration of a multi-stage vacuum generator to be connected to line 14 of the unit according to FIG. 2.

In the two-stage vacuum generation arrangement according to FIG. 4 the vapours from outlet 14 of the loop-type evaporator 9 and the caprolactam operating steam of the steam jet pumps 26, 26' arranged in series are condensed by injecting caprolactam of a temperature of about 90° C. into the injection condensers 18'/18". The caprolactam issuing from the injection condensers 18'/18" is combined and recycled via a loop to injection condensers 18'/18". The loop consists of: injection condenser 18'/injection condenser 18"; dip tank 19' with a barometric seal; circulating pump 20' and a heat exchanger 21' for adjusting the loop temperature. From the loop a branch stream 25 of caprolactam equal to the quantity of propellant for the steam jets 26, 26' and the quantity of condensed dimers is continuously discharged. The caprolactam discharged is reused as a raw material in the polycondensation reaction. For the generation of the preliminary pressure a liquid ring vacuum pump 22' is arranged downstream of the second injection condenser 18".

The caprolactam operating steam 29 of a temperature of about 300° C. required for the steam jets 26, 26' is produced in evaporator 30. Liquid caprolactam is used as the liquid required for the functioning of the vacuum pump 22'. For this purpose a small branch stream is taken from the above-mentioned caprolactam loop and delivered to the vacuum pump 22'. Then the excess caprolactam is recycled into the loop. The non-condensed components from the polymer melt and the inert carrier gas (when using nitrogen as an entraining agent) are drawn off by suction by the vacuum pump 22' and delivered to an exhaust gas cleaning unit 24.

The foregoing examples of the present invention are offered for the purpose of illustration and not limitation. It will be apparent to those skilled in the art that the embodiments described herein may be modified or revised in various ways without departing from the spirit and scope of the invention. The scope of the invention is to be measured by the appended claims.

What is claimed is:

1. A process for producing polyamide or copolyamide freed from volatile constituents from a polyamide 6 or a copolyamide of polyamide 6 in a melt, comprising:
  introducing a polymer melt into first shell-and-tube heat exchanger at a temperature of 200 to 300° C.;
  evaporating monomers and dimers at a temperature in the shell-and-tube heat exchanger of 250 to 300° C.;
  removing the volatile constituents in a first separator connected downstream at a pressure of at most 300 mbar (300 hPa) and at a temperature in the first separator of 250 to 300° C.;
  introducing a gaseous entrainer into the degassed polymer in a molar ratio of entrainer to polymer of at least 1:1;
  dispersing the entrainer in the polymer melt with a static mixing element;
  introducing the mixture into a second shell-and-tube heat exchanger or a loop-type evaporator or a combination of a second shell-and-tube heat exchanger and loop-type evaporator, in each case with a second separator connected downstream;
  evaporating further volatile constituents at a temperature of 250 to 350° C.;
  removing the further volatile constituents in the second separator at a pressure of at most 300 mbar (300 hPa) and at a temperature in the second separator of 250 to 300° C.; and removing the degassed polymer melt from the second separator.

2. The process according to claim 1 further including immediately compounding the melt issuing from the second separator or providing said melt with additives.

3. The process according to one of claims 1 and 2, wherein the degassed polymer is processed to granules immediately after removal from the second separator and optionally compounded.

4. The process according to one of claims 1 and 2, wherein the polymer comprises a polyamide 6 or a copolyamide of the polyamide 6 with a relative viscosity of 2.4 to 4.6.

5. The process according to one of claims 1 and 2, wherein the first separator further includes a vacuum generator comprising a combination arranged in loop form of a liquid ring pump, an injection condenser, a dip tank and a circulating pump with liquid caprolactam as the condensing agent.

6. The process according to claim 5, wherein the injection condenser is preceded by a steam jet with caprolactam as the propellant.

7. The process according to claim 5, wherein the injection condenser is preceded by a series-connected combination of a first steam jet, art injection condenser and a second steam jet, wherein the condensate at the bottom of the additional injection condenser is delivered to the dip tank and wherein the propellant used for the steam jets is caprolactam.

8. A polyamide composition of polyamide 6 or a copolyamide with polyamide 6 with a reduced content of volatile constituents made by degassing a polymer melt, having a monomer ($\epsilon$-caprolactam) content of at most 0.7 wt. %, and a dimer content of at most 0.3 wt. %.

9. A molding composition for producing molded articles, films, hollow articles (un)reinforced semi-finished products, fibers or monofilaments and other articles containing the polyamide composition according to claim 8.

10. A molded article, film, hollow article, (un)reinforced semi-finished product, fiber or monofilament produced from the molding composition according to claim 9.

11. The process of claim 1, wherein the pressure in the first separator is from 10 to 300 mbar (10 to 300 hPa).

12. The process of claim 1, wherein the pressure in the first separator is from 10 to 30 mbar (10 to 30 hPa).

13. The process of claim 1, wherein the gaseous entrainer is selected from the group consisting of nitrogen, inert gas, carbon dioxide and water vapor.

14. The process or claim 1, wherein the molar ratio of entrainer to polymer is 1:1 to 10:1.

15. The process of claim 1, wherein the molar ratio of entrainer to polymer is 1:1 to 4:1.

16. The process of claim 1, wherein the pressure in the second separator is at most 8 mbar (8 hPa).

17. The process of claim 1, wherein the pressure in the second separator is at most 2 mbar (2 hPa).

18. The process according to one of claims 1 or 2, wherein the polymer comprises a polyamide 6 or a copolyamide of the polyamide 6 with a relative viscosity $\eta$rel of 2.5 to 3.5.

19. The process according to one of claims 1 or 2, wherein the polymer comprises a polyamide 6 or a copolyamide of the polyamide 6 with a relative viscosity $\eta$rel of 2.6 to 3.2.

20. A polyamide composition of polyamide 6 or a copolyamide with polyamide 6 with a reduced content of volatile constituents, made by degassing a polymer melt having a monomer ($\epsilon$-caprolactam) content of at most 0.3 wt. %.

21. A polyamide composition of polyamide 6 or a copolyamide with polyamide 6 with a reduced content of volatile constituents, made by degassing a polymer melt having a monomer ($\epsilon$-caprolactam) content of at most 0.2 wt %.

22. A polyamide composition of polyamido 6 or a copolyamide with polyamide 6 with a reduced content of volatile constituents, made by degassing a polymer melt having a dimer content of at most 0.2 wt. %.

23. A polyamide composition of polyamide 6 or a copolyamide with polyamide 6 with a reduced content of volatile constituents, made by degassing a polymer melt having a dimer content of at most 0.15 wt. %.

* * * * *